(12) United States Patent
Reissman et al.

(10) Patent No.: US 7,302,677 B2
(45) Date of Patent: Nov. 27, 2007

(54) EVENT DRIVEN GRAPH EXPLORER FOR MODEL-BASED TESTING OF SOFTWARE

(75) Inventors: Pierre-Jean Reissman, Bellevue, WA (US); Michael R. Rohman, Bothell, WA (US); Praveen K. Krovvidi, Redmond, WA (US); William B. Lindquist, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 10/431,733

(22) Filed: May 8, 2003

(65) Prior Publication Data
US 2004/0225919 A1     Nov. 11, 2004

(51) Int. Cl.
  *G06F 9/44*   (2006.01)
  *G06F 9/45*   (2006.01)
(52) U.S. Cl. .................. 717/135; 717/124; 717/127
(58) Field of Classification Search ........ 717/124–130, 717/135–140
  See application file for complete search history.

(56) References Cited

U.S. PATENT DOCUMENTS

| | | | | |
|---|---|---|---|---|
| 5,315,709 | A  * | 5/1994 | Alston et al. .................... | 707/6 |
| 5,493,680 | A  * | 2/1996 | Danforth ..................... | 717/108 |
| 6,134,706 | A  * | 10/2000 | Carey et al. ................. | 717/102 |
| 6,249,907 | B1 * | 6/2001 | Carter et al. ................. | 717/129 |
| 6,408,403 | B1 | 6/2002 | Rodrigues et al. | |
| 6,543,049 | B1 * | 4/2003 | Bates et al. .................. | 717/129 |
| 6,633,837 | B1 * | 10/2003 | Dye et al. ....................... | 703/9 |
| 6,795,963 | B1 * | 9/2004 | Andersen et al. ............ | 717/130 |
| 6,826,744 | B1 * | 11/2004 | McAuley ..................... | 717/108 |
| 6,934,673 | B2 * | 8/2005 | Alvarez et al. ................ | 703/21 |
| 6,934,931 | B2 * | 8/2005 | Plumer et al. ............... | 717/104 |
| 6,944,848 | B2 * | 9/2005 | Hartman et al. ............ | 717/124 |
| 6,983,456 | B2 * | 1/2006 | Poznanovic et al. ......... | 717/133 |
| 7,047,518 | B2 * | 5/2006 | Little et al. .................. | 717/108 |
| 7,069,536 | B2 * | 6/2006 | Yaung ......................... | 717/102 |

OTHER PUBLICATIONS

Shanmugan, An update on software packages for simulation of communication systems (links), IEEE, vol. 6, No. 1, pp. 5-12, 1988.*
Lerner et al, "Verifying process models built using parameterized state machines" ACM ISSTA, pp. 274-284, 2004.*
Reiss et al, "Specifying and checking component usage", ACM AADEBUG, pp. 13-22, 2005.*
Musuvathi et al, "Model checking system software with CMC", ACM SIGOPS, pp. 219-222, Jul. 2002.*
Petri Networks, *Definition and Basic Ideas*, retrieved from http://staff/um.edu.mt/jskl1/petrisim/petri.html on Apr. 14, 2003, pp. 1-48.
Petri Nets, *What is a Petri Net?*, retrieved from http://pdv.cs.tu-berlin.de/~azi/petri.html on Apr. 15, 2003, pp. 1-3.

* cited by examiner

*Primary Examiner*—Anil Khatri
(74) *Attorney, Agent, or Firm*—Lee & Hayes, PLLC (57) ABSTRACT

A software testing system uses a graph traversal algorithm to explore a model simulating a software product in order to identify errors in the software product. The model employs a Petri's net construct for maintaining state and governing transitions. In particular, the model mediates between a test driver and the software product. The model-based approach is usable both to validate the design of the software and verify the implementation of that design. Using the Petri net model, the test space is bounded.

14 Claims, 12 Drawing Sheets

EVENT DRIVEN GRAPH EXPLORER FOR MODEL-BASED TESTING OF SOFTWARE

TECHNICAL FIELD

This invention relates generally to computer software development and, more particularly, relates to automated model-based testing of computer software using an extended Petri's net formulation.

BACKGROUND OF THE INVENTION

Computers and computerized devices have become increasingly common and increasingly powerful in today's world, enabling automation of tasks previously performed by humans, and in addition performing or facilitating some tasks that were previously impossible. However, as powerful as computers are, the process of creating the software typically used by computers is still a very human-oriented process. Typically, a designer first creates a specification that describes the desired functionality of a piece of software. Subsequently, a developer writes computer code, typically in source code form, to instruct the computer as what operations to perform, actions to take, etc. Once the source code is complete, computer-readable code may be created therefrom. As will be appreciated by those of skill in the art, this process of converting source code into a computer-readable form is often referred to as "compiling."

Once the compiled version of the code has been produced, the first stage of development is over, but the software is typically not yet ready to be released to the public or other intended consumer. Rather, a testing process is now initiated to identify and correct any bugs, errors, or flaws in the software. At this stage in development, the types of problems that are addressed are typically coding or implementation errors, rather than errors in usability, or other similar errors that pertain more to the overall design of the software as embodied in the specification.

The testing process is an expensive and time-consuming process. Typically an individual called a "tester" tests specific use scenarios with respect to the software. This may be done in a number of ways. One way is for the tester to actually operate the software in the same manner that an end-user would, trying out many different types of operations, keystrokes, menu selections, etc. During this process, the tester observes the behavior of the software, as executed by the computer, to identify any odd or incorrect behavior. The tester reports any problems to the developers, who in turn typically will rewrite a portion of the source code to correct the problem. It will be appreciated that this method of testing is expensive and time consuming. Moreover, the test space, or the group of all actions and combinations thereof that the tester could possibly test, is enormous. Given the complexity of present software products, the test space is essentially unbounded, i.e. due to time or other constraints, a human tester will typically not be able to test every action or combination of actions that is in the test space, and moreover may not even be aware of many or most such actions or combination of actions.

Another method often used to test software involves the production of test code. In particular, an individual familiar with the target software and its intended operation can write test code that will manipulate the software in the same way that might result from actual use of the software by an end user. Typically, the test code functions at a fairly low level, interfacing directly with APIs rather than interfacing with the system from the high level at which an actual user would operate. Although this approach is common, and may be preferable over other existing types of testing, it does possess a number of rather serious shortcomings. For example, a primary weakness of this method is that, like the previously discussed manual testing method, it is bounded by human creativity and time constraints in defining and traversing usage scenarios.

SUMMARY OF THE INVENTION

Embodiments of the invention are directed to an automated graph traversal algorithm for identifying errors in computer code using a model. The model employs a Petri's net construct for maintaining state and for governing transitions in the model of a target body of software. In particular, the model of a software body is extracted and acts as a mediator between a test driver and an implementation of the software body. The model-based approach is usable both to validate the design of the software and to verify the implementation of that design. In contrast to prior methods that test a selection of use scenarios without testing or even identifying the remaining scenarios, the graph traversal algorithm according to an embodiment of the invention is usable to provide deterministic coverage on scenarios whether it tests all or only some. In this way, the test space is bounded rather than fairly unlimited and unmanageable. Generally, embodiments of the invention provide a number of other benefits as well, including hiding unnecessary complexity while preserving and using the relevant details, and providing improved efficiency and cost effectiveness in code testing by testing many more use scenarios without requiring additional effort or time from a human tester.

The steps exercised in testing software in accordance with many embodiments of the invention include first building a model of the software using the design specification for the software. The model may be a state machine that embodies state and also supports the passing of tokens to model sequential operations, numerical bounds, etc. In an embodiment of the invention, a tester extracts states, guards, and transitions from the specification and codes them via the model. Methods and attributes can be obtained through system reflection, and used to build configuration files for the test driver. Next, the model is linked to the implementation of the design. Finally, an event generator uses the model to simulate operation of the software. In particular the event generator uses graph theory to traverse the model, exploring millions of test situations. The event generator may also test specified scenarios. As a final step, the event generator reports bugs and errors to allow developers or other personnel to take corrective action.

The modular nature of the code checking process also provides robustness with respect to code changes. For example, if 5% of the target code changes, there will be an approximately 5% impact on the model. In an embodiment, any changes that render the model syntactically incorrect are flagged for correction. Furthermore, in embodiments of the invention, a tester may choose to ignore certain areas of the model.

In an embodiment of the invention, a collection of graph traversal algorithms is employed to represent test sequence scenarios. The first graph traversal algorithm is based on random exploration of the graph resulting from the model. As transitions occur, objects may change state and tokens can move from state to state. A key that is used as a seed controls the randomness of the graph traversal, with the two simulations using the same seed yielding the same exploration path. Transitions with respect to states are weighted to give the probability of occurrence for each transition. The weights may also be used to forbid one or more transitions, such as private transitions or transitions to be skipped at that time due to incompleteness or otherwise.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is described hereinafter in the context of a computing environment. Although it is not required for practicing the invention, the invention is described as it is implemented by computer-executable instructions, such as program modules, that are executed by a personal computer (PC) or other computer. Generally, program modules include routines, programs, objects, components, data structures and the like that perform particular tasks or implement particular abstract data types.

The invention may be implemented in computer system configurations other than a PC. For example, hand-held devices, multi-processor systems, microprocessor-based or programmable consumer electronics, network PCs, minicomputers, mainframe computers and the like may be used in implementations of the invention. The invention may also be practiced in distributed computing environments, where tasks are performed by remote processing devices that are linked through a communications network. In a distributed computing environment, program modules may be located in both local and remote memory storage devices.

Although the invention may be incorporated into many types of computing environments as suggested above, the following detailed description of the invention is set forth in the context of an exemplary general-purpose computing device in the form of a computer 20. Thus, before describing the invention in detail, the exemplary computing environment in which the invention may be implemented is described in connection with FIG. 1.

Figure 1:
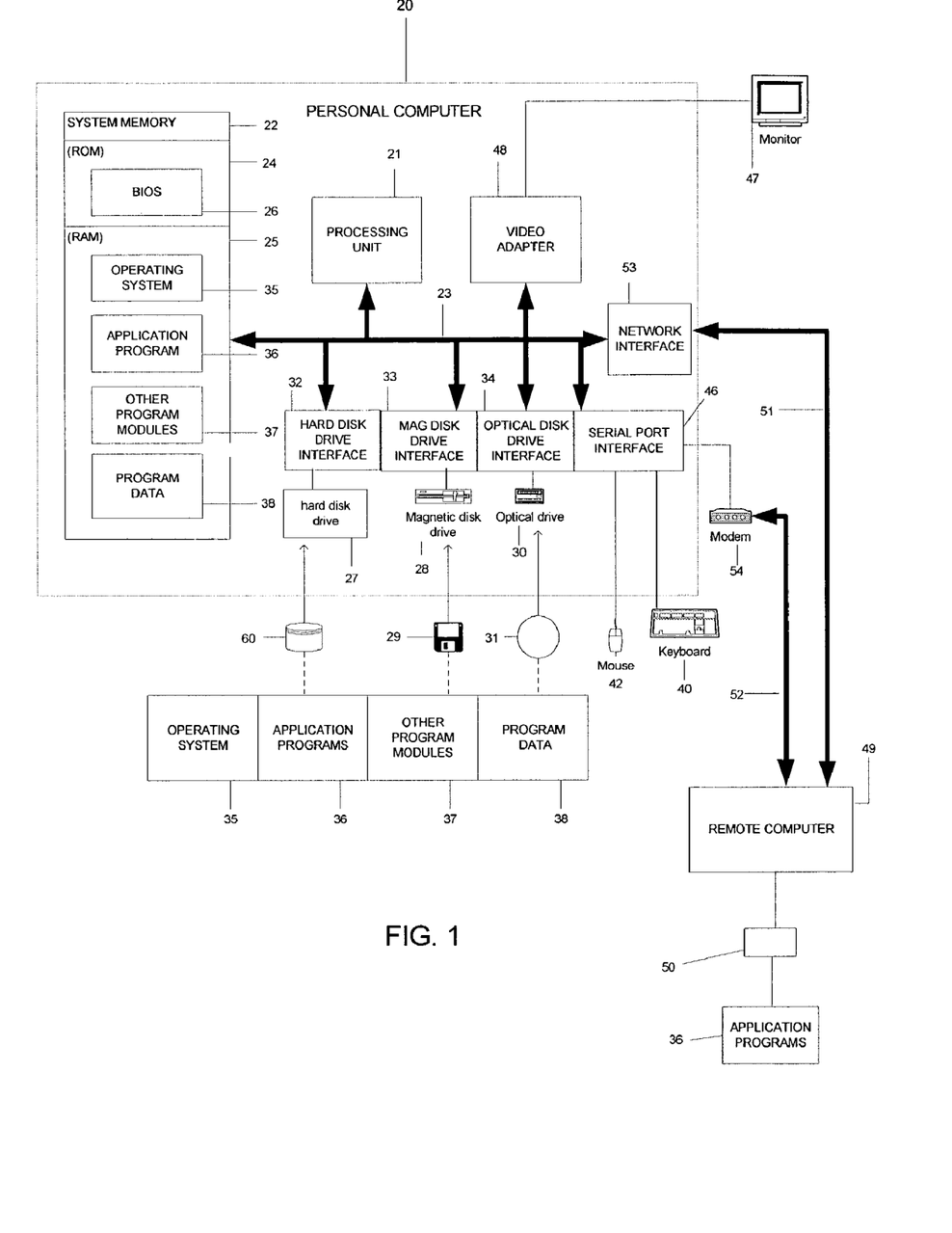
FIG. 1 is a block diagram generally illustrating an exemplary computer system usable in an implementation according to an embodiment of the present invention.

The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the PC 20, such as during start-up, is stored in ROM 24. The PC 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, memory keys, memory sticks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices, not shown, such as speakers and printers.

The computer 20 may operate in a networked environment using logical connections to one or more remote computers, such as a remote computer 49. The remote computer 49 may be a PC, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the WAN 52. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

In accordance with one embodiment of the invention, a Petri net formulation is used to model a software application or other target software body under test. The concept of a Petri net was first introduced in the dissertation *Kommunikation mit Automaten*, submitted in 1962 by Carl Adam Petri to the faculty of Mathematics and Physics at the Technische Universitäat Darmstadt, Germany. In overview a Petri net is a graphical and mathematical modeling tool that is characterized by a number of elements including places, tokens at places (and passable between places), transitions, and arcs that interconnect places and transitions.

Arcs that connect places to transitions are referred to as "input arcs," while arcs that connect transitions to places are referred to as "output arcs." In other words, an input arc originates at a place and terminates at a transition, while an output arc originates at a transition and terminates at a place.

A Petri net usable within an embodiment of the invention is not limited to these specific arcs, and it will be appreciated by those of skill in the art that there are a number of other arcs that may be used additionally or alternatively.

The transitions are the active elements of the model, representing actions that can occur in the system. The occurrence of such an action is referred to as a "firing" of the associated transition. The state of the Petri net at a given time is represented in the number and types of tokens that reside in each place. Thus, the firing of a transition changes the state of the system. The state, i.e. the locations of the tokens, is also sometimes referred to as the marking of the system.

A transition cannot occur unless that transition is "enabled." In general, a transition is enabled once the predetermined criteria governing the transition are met. For example, one possible criterion is that a certain number, or at minimum a certain number, of tokens must reside at the input to the transition, i.e. at the place at the other end of the input arc. Additionally or alternatively, it may be required that a given number of tokens must or must not reside at the output from the transition. When the transition fires or occurs, it decrements, by one or more, the number of tokens at its input places and increments the number of tokens at its output places. It will be understood herein that the term "fire" simply connotes occurrence of the specified event or transition without any further limitations intended. Each arc may have a cardinality or order, and the number of tokens passed during a transition firing is a function of the order of the relevant arc. When multiple transitions are simultaneously enabled, the concept of transition priority is useful. In particular, an enabled transition with a certain priority will not fire until after any other enabled transition having a higher priority has fired.

In order to more realistically model a system under test, a transition delay may be used to temporarily inhibit enabled transitions that would otherwise fire. For example, certain types of transitions may be delayed by a predetermined amount to account for real-world timing, and/or a random or pseudo-random delay may be applied to some transitions to model real-world variability or uncertainty.

Figure 2A:
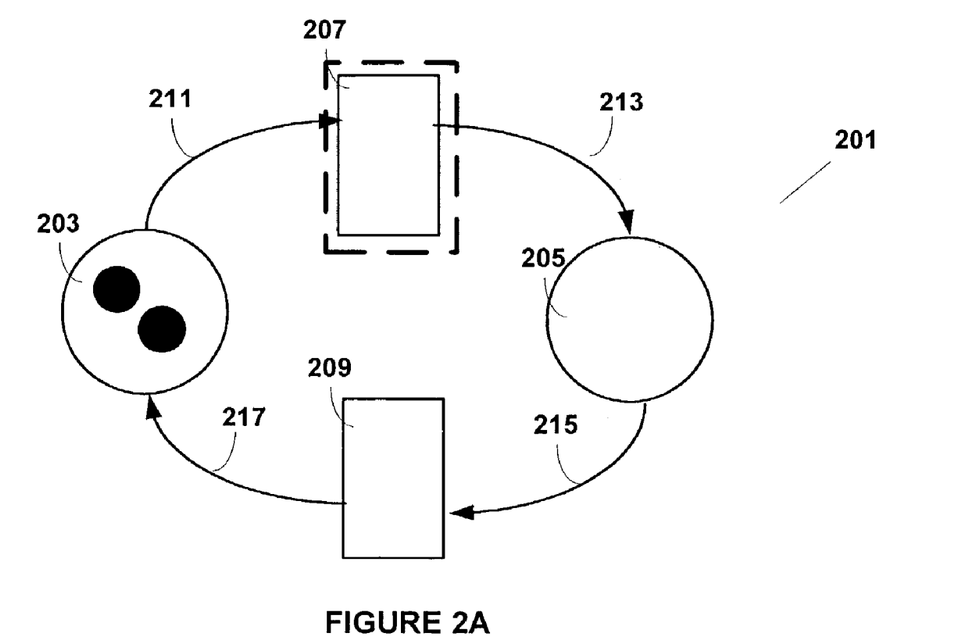
FIG. 2A is a state diagram embodying an example Petri net having states and employing tokens to allow or disallow transitions.
Figure 2B:
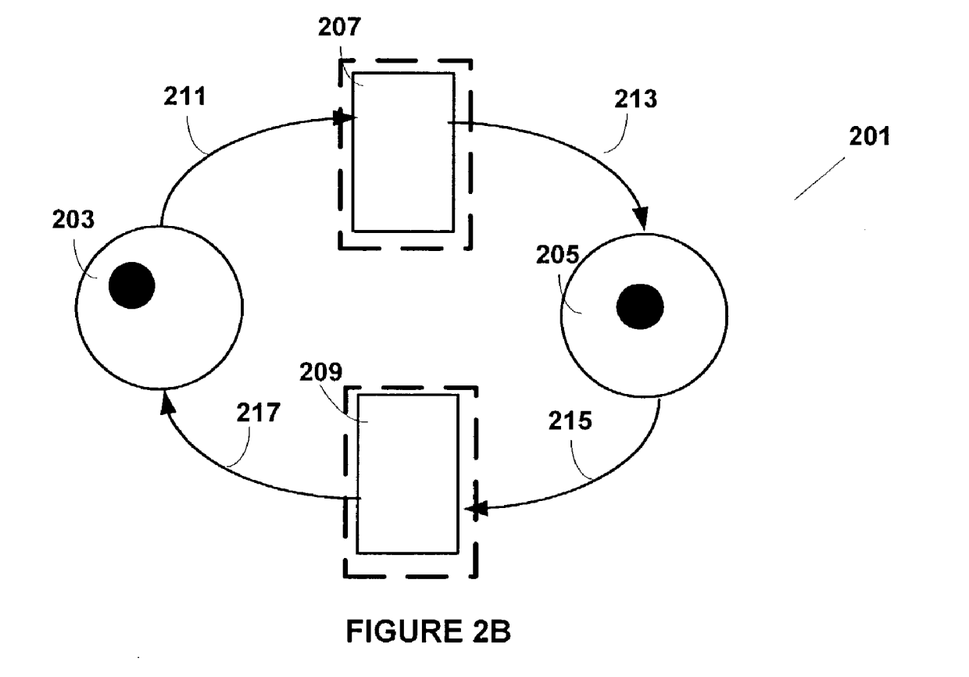
FIG. 2B is a state diagram embodying an example Petri net having states and employing tokens to allow or disallow transitions, wherein the Petri net is in another state.
Figure 2C:
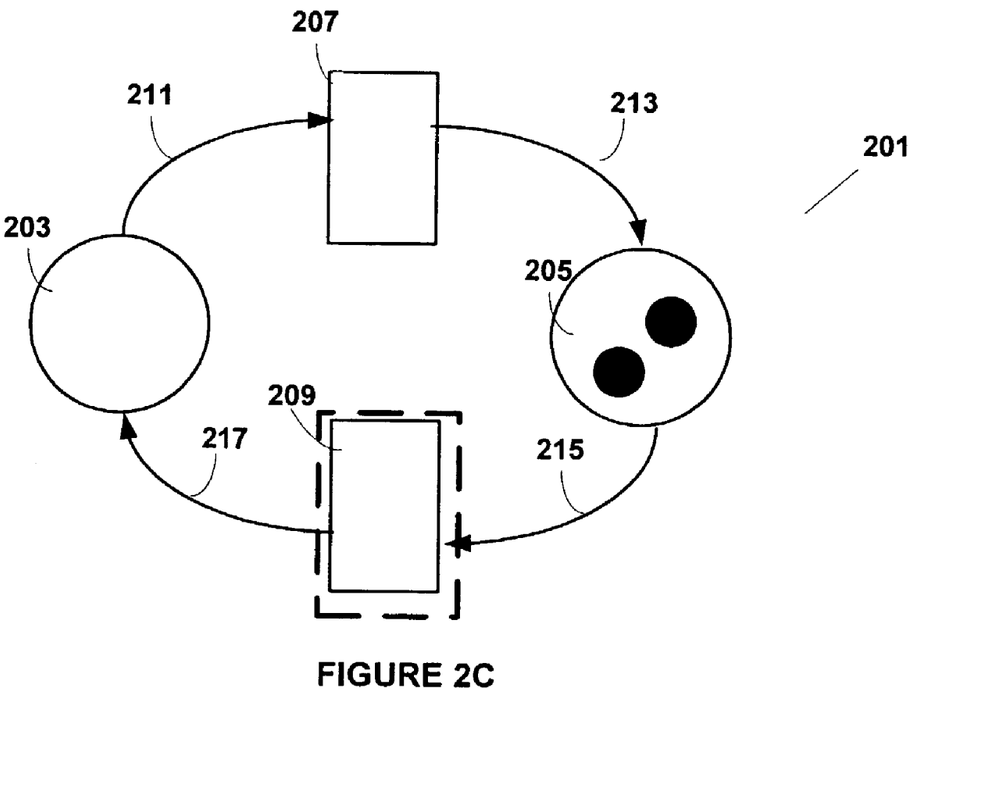
FIG. 2C is a state diagram embodying an example Petri net having states and employing tokens to allow or disallow transitions, wherein the Petri net is in yet another state.

A simplified example Petri net is shown in FIGS. 2A-2C. In particular, the Petri net 201 comprises a ring structure with two places 203, 205, and two transitions, 207, 209. Transition 207 has input and output arcs 211, 213 connected to places 203 and 205 respectively. Transition 209 has input and output arcs 215, 217 connected to places 205 and 203 respectively. Although any combination of token rules, arc order and transition priorities are possible, the example Petri net shown in FIGS. 2A-2C has arc order of 1 (i.e. one token is transferred per transition firing), and the precondition for firing of either transition 207, 209 is that a token is waiting at the input place 203, 205. Each transition that is enabled is circumscribed by a dashed lined. Thus in FIG. 2A, transition 207 is enabled, while transition 209 is not enabled. After firing of transition 207, the state of the Petri net is as shown in FIG. 2B. A token has been passed from one place 203 to the other 205. Both transitions 207, 209 are now enabled, since the precondition is met for both, i.e. a token awaits at the respective input place 203, 205 for each. From this state, a firing of transition 209 would result in a restoration of the original state as shown in FIG. 2A. If instead transition 207 fires, the resultant state is shown in FIG. 2C. It can be seen that the tokens now both reside at place 205. As a result, transition 209 is enabled, but transition 207 is not.

In keeping with the invention, operation of a software body, such as an application or other software, is simulated via a Petri net that is directed via an event driven generator engine using graph traversal algorithms. An overview of the architecture of the error correction system in keeping with an embodiment of the invention will be discussed with reference to FIG. 3. The system 301 comprises primarily a simulation model 303, a model editor 305, a graph traversal algorithm set 307, and an event-driven generator engine 309, and includes or interfaces with a software specification 311 and a corresponding software implementation 313 under test. The software specification 311 is used by testing personnel to develop the simulation model 303 using the model editor 305. The software implementation 313 should typically conform to the specification 311 as well, since the specification 311 is a first step in development that is used by developers in creating a corresponding implementation. The graph traversal algorithm set 307 is created by the event-driven generator engine 309, which uses the algorithms of the graph traversal algorithm set 307 to explore the simulation model 303 to test the software implementation 313, as will be discussed in greater detail hereinafter.

Figure 4:
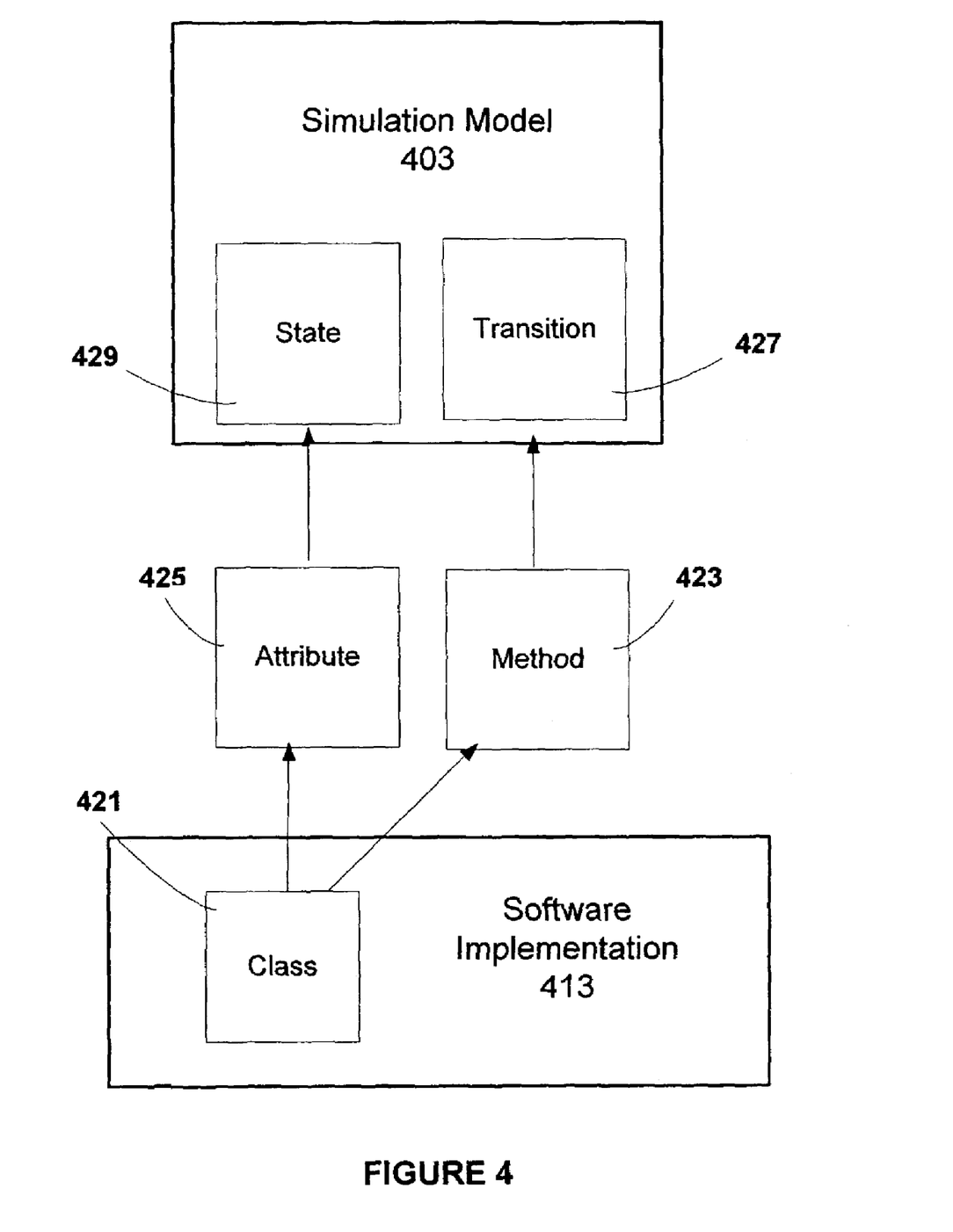
FIG. 4 is a relational diagram illustrating the relationship of a class in the software product to the simulation model.

FIG. 4 illustrates in greater detail an aspect of the relationship between the simulation model 303 and the software implementation 313, referred to in FIG. 4 by the reference numerals 403 and 413 respectively. The software implementation comprises objects, each of which has a class 421. Each class 421 in turn comprises at least one method 423 and at least one attribute 425. The methods 423 can be viewed as potential actions, and hence each method is likened to a transition 427 in the simulation model 403. Similarly, the collection of the current conditions of each attribute 425 represents the state of the system. Hence, each attribute 425 is likened to a state 429 in the simulation model 403. The method of extracting the class methods 423 and attributes 425 to build the simulation model 403 is not critical.

A human operator may perform the extraction based on the software specification 311, or an automatic extraction of some or all of this information based on an actual implementation 313 may be executed instead or in addition. It is the behavior of the collective system embodied in the software implementation 313 that is to be tested for conformance to the desired behavior as embodied in the software specification 311. Hence the actual behavior of the simulation model 403 is still preferably coded into the model 403 based on the software specification 311. For example, based on the software specification 311, a transition from a given marking should result in a particular state of the simulation model 403. The model is thus preferably constructed in accordance with this constraint rather than in accordance with the actual behavior of the actual implementation 313. In fact, there is no requirement that the software implementation 313 be complete at the time that the simulation model 403 is constructed. For example, it may be desired to test the function and coherence of the system described by the specification prior to constructing an actual implementation based on that specification.

Figure 5A:
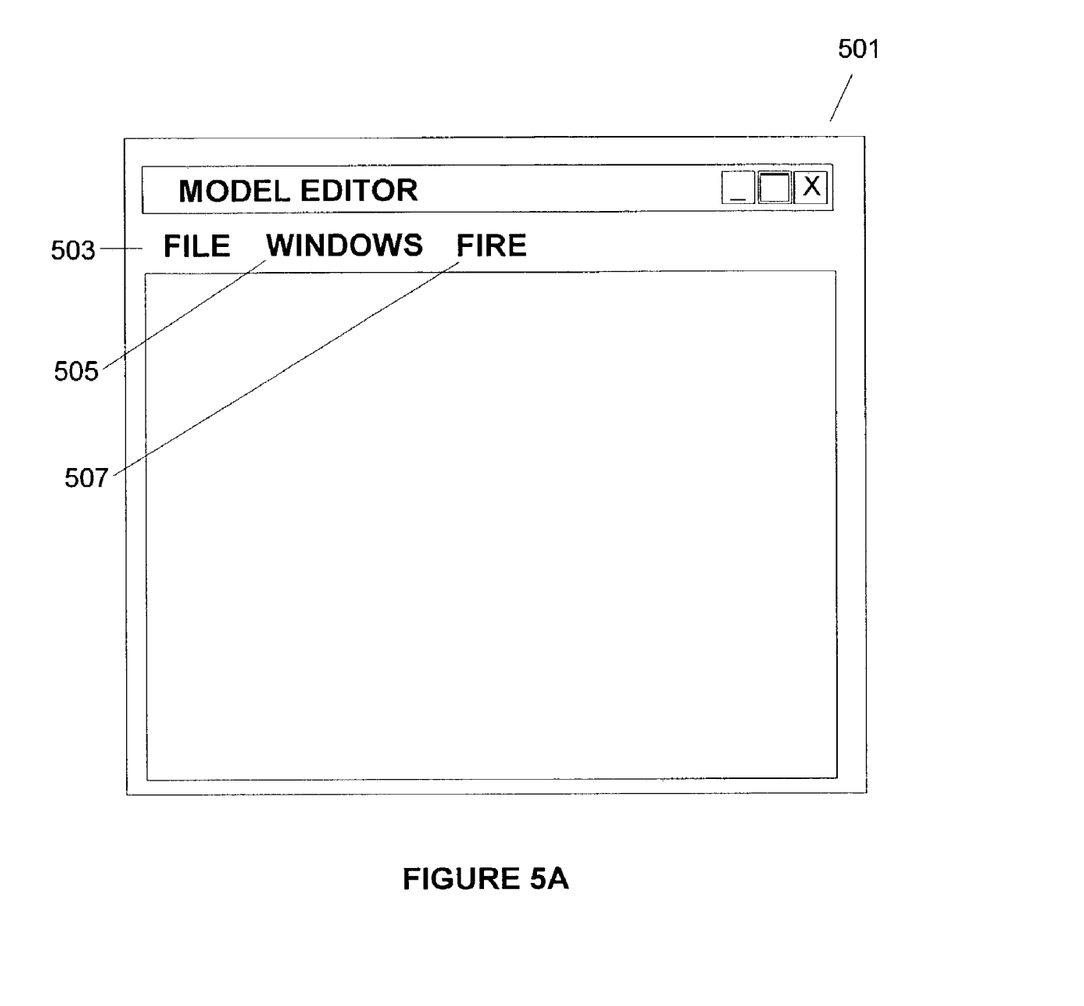
FIG. 5A is a user interface illustration showing an interface to a model editor.

An example user interface for the model editor 305 is shown in greater detail in FIGS. 5A-5D. FIG. 5A shows the interface 501 having unselected menu items "File" 503, "Windows" 505, and "Fire" 507. Generally, the "File" menu item 503 is selectable to present an array of file-related commands and options, as will be discussed in greater detail with respect to FIG. 5B. The "Windows" menu item 505 is selectable to present an array of commands and options related to windows and views, as will be discussed in greater detail with respect to FIG. 5C. Finally, the "Fire" menu item 507 is selectable to present an array of commands and options related to the operation of the simulation, as will be discussed in greater detail with respect to FIG. 5D.

Figure 5B:
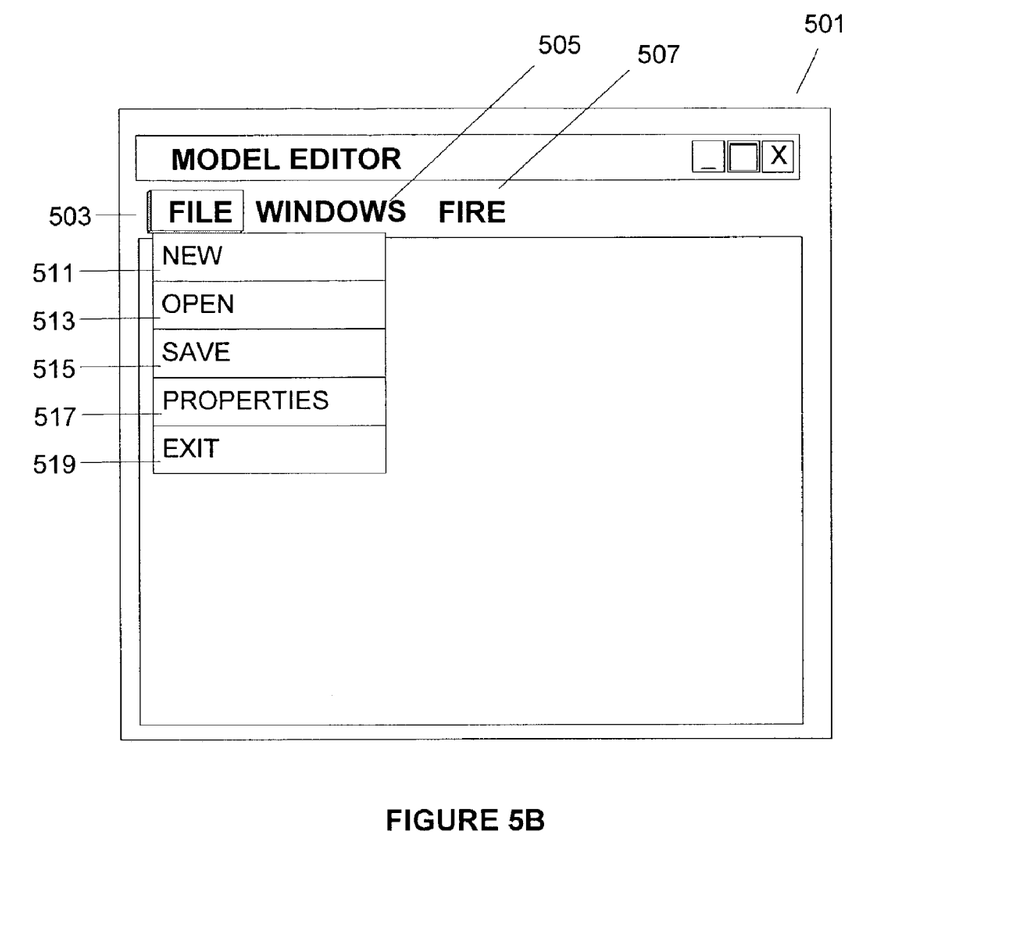
FIG. 5B is a user interface illustration showing an interface to a model editor, wherein a first menu item has been selected.

FIG. 5B illustrates the user interface 501 of FIG. 5A wherein the user has selected the "File" menu item 503. Pursuant to the user selection, a drop-down menu is presented having therein a number of options. The options illustrated in the example of FIG. 5B include a "New" option 511, an "Open" option 513, a "Save" option 515, a "Properties" option 517, and an "Exit" option 519. The "New" option 511 is usable by the operator to create a new project. Preferably, the user specifies both a name and location for the file corresponding to the project, as well as a name and location for the implementation to be tested by the new model. In addition, a seed value is used in certain embodiments of the invention, and the user may either specify a seed value when creating a new project or a default seed value, such as 1234, may be used. The seed insures that graph traversal algorithm generators will produce the same sequence of random values in order to insure reproduction of the exploration path. Using a different seed would usually produce a different traversal of the state space. A random generator is used for specific graph traversal algorithm requiring random data, however for fully deterministic graph traversal algorithms, a random seed value is not required.

The "Open" option 513 is usable by the operator to open a previously created project by browsing for and selecting such a project. The "Save" option 515 is usable by the operator to save the current project. If the project has not been named and a memory storage location specified for the project prior to selection of the "Save" option 515, the user is preferably prompted to enter a name and location upon selection of the "Save" option 515. The "Properties" option 517 allows a user to view and modify the properties of the project, e.g. the implementation version being tested, the seed value, and so on. Finally, the "Exit" option 519 allows a user to exit the model editor program.

Figure 5C:
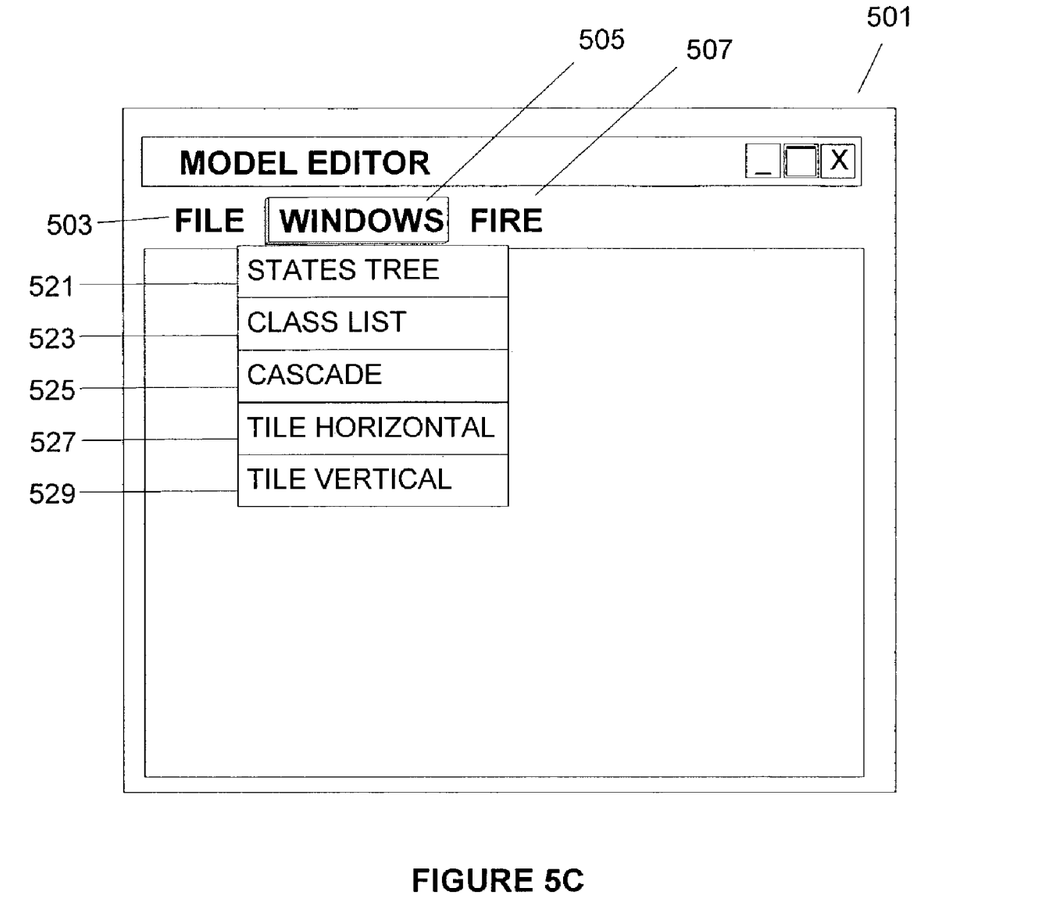
FIG. 5C is a user interface illustration showing an interface to a model editor, wherein a second menu item has been selected.

FIG. 5C illustrates the user interface 501 of FIG. 5A wherein the user has selected the "Windows" menu item 505. As with the "File" menu item 503, a drop-down menu is presented pursuant to the user selection of the "Windows" menu item 505, having therein a number of options. As illustrated in the example of FIG. 5C, the options include a "States Tree" option 521, a "Class List" option 523, a "Cascade" option 525, a "Tile Horizontal" option 527, and a "Tile Vertical" option 529. The "States Tree" option 521 is usable by the operator to display a tree of states of the model. The "Class List" option 523 can be selected to provide a list of available classes in the assembly under test. Preferably extended selection is available, and each class has only one component model corresponding to it. The "Cascade" option 525 simply acts to cascade the model editor windows. Each of the "Tile Horizontal" option 527, and the "Tile Vertical" option 529 causes the windows associated with the model editor to be arranged in the respective specified manner.

Figure 5D:
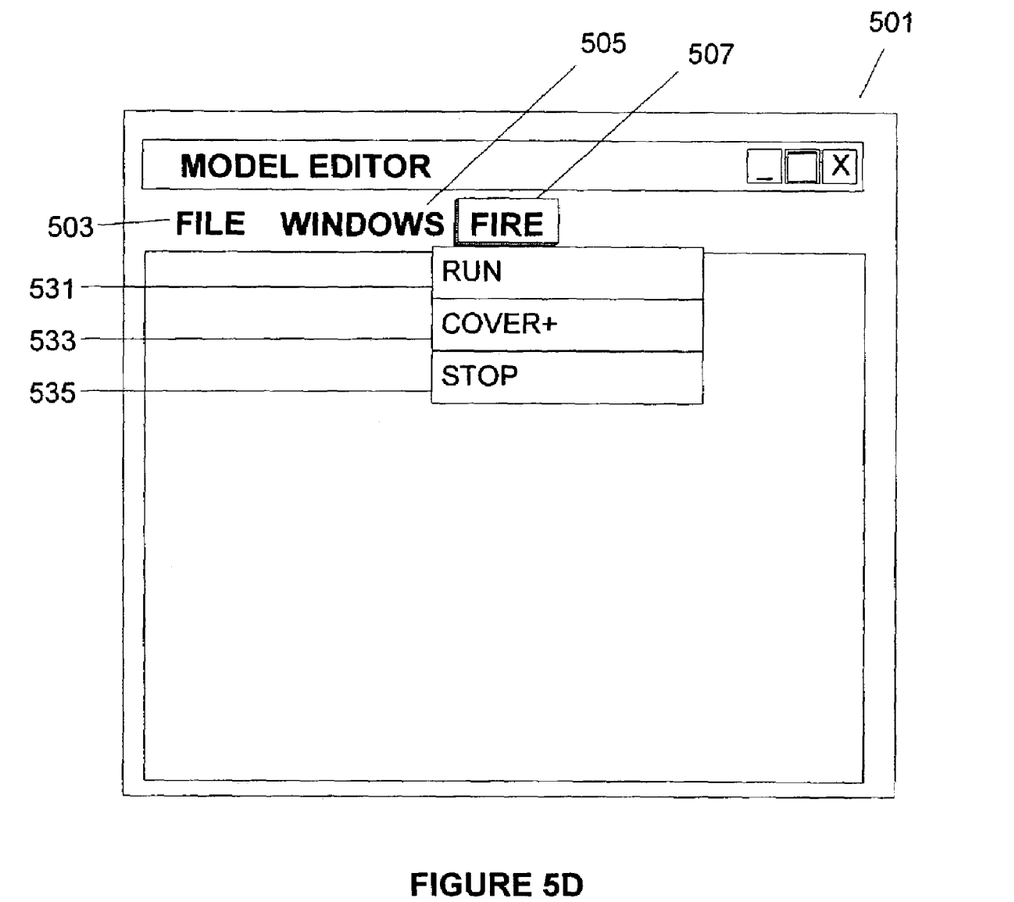
FIG. 5D is a user interface illustration showing an interface to a model editor, wherein a third menu item has been selected.

FIG. 5D illustrates the user interface 501 of FIG. 5A wherein the user has selected the "Fire" menu item 507. As with the previously described menu items, a drop-down menu is presented pursuant to the user selection of the "Fire" menu item 507, the drop-down menu containing a number of options. As illustrated in the example of FIG. 5D, the options include a "Run" option 531, a "Cover+" option 533, and a "Stop" option 535. Selection of the "Run" option 531 acts to start the simulation pursuant to the model. Preferably a recompilation of the assembly under test and the model are performed at this time prior to running to assure inclusion of any changes to the code or the model. If any errors are found, a list of errors is displayed. If there are no errors, the simulation is run. Selection of the "Cover+" option 533 causes a graph traversal algorithm to be used that ensures traversal of all reachable paths and unreachable paths are reported. The simulation ends when there are no further paths to traverse. Finally, selection of the "Stop" option 535 causes the simulation to be stopped and causes a report of the simulation results to be released, such as to a predetermined directory or other location.

Figure 6A:
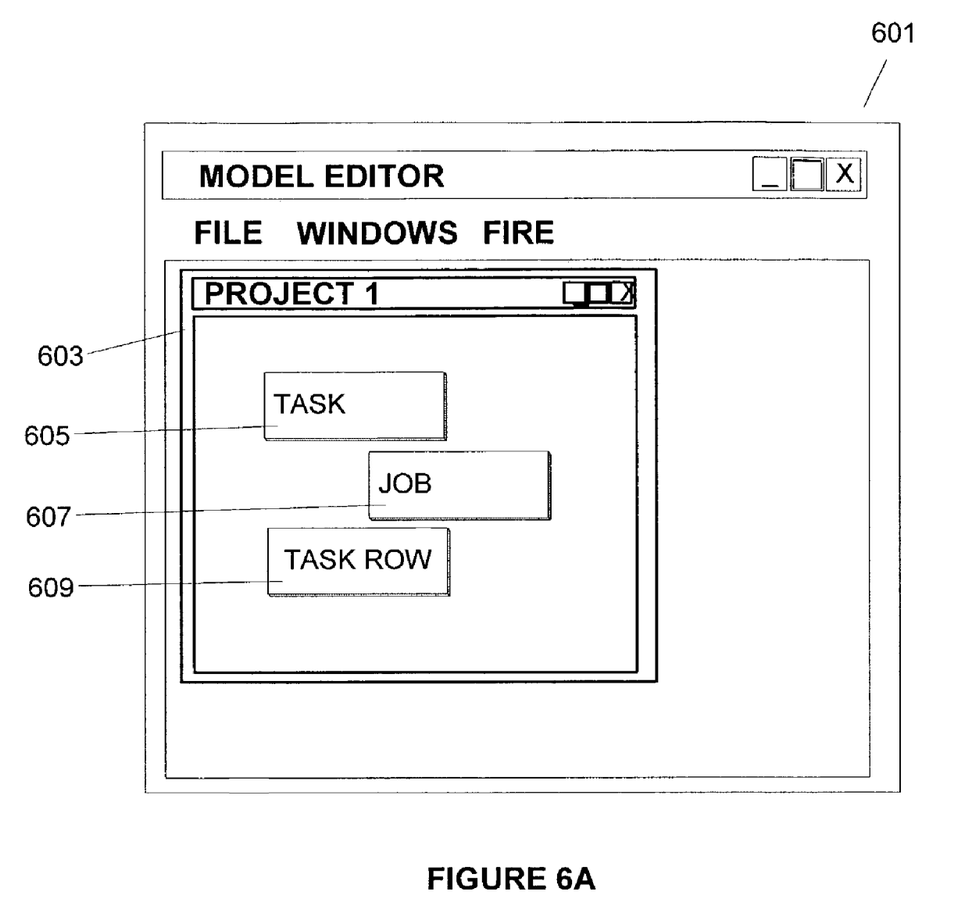
FIG. 6A is a user interface illustration showing an interface to a model editor, wherein a project window is displayed.
Figure 6B:
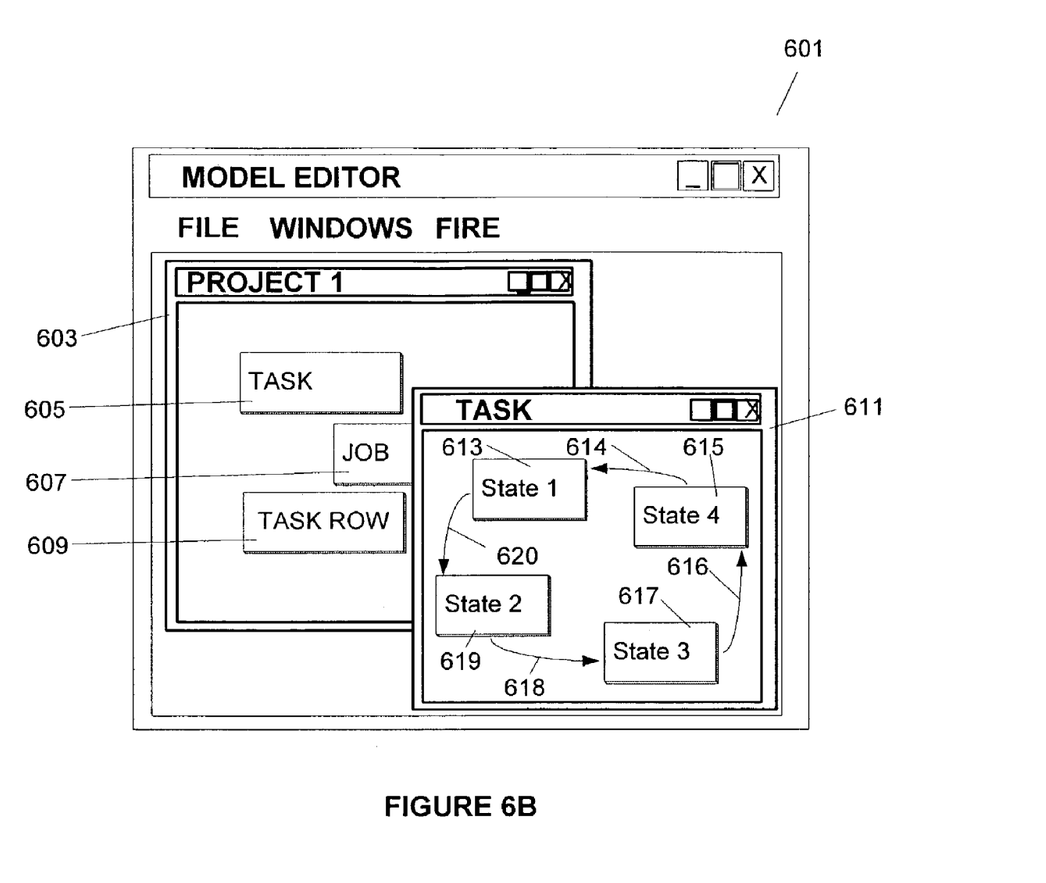
FIG. 6B is a user interface illustration showing an interface to a model editor, wherein a project window and a hierarchically related component window are both displayed.

FIGS. 6A and B show other user interface aspects of the model editor 305. In particular, FIG. 6A shows a project window 603 within model editor window 601. The project window 603 corresponds to a project entitled "Project 1" as indicated in its title bar. Within the project window 603 there are icons associated with classes within the model of Project 1. In the example of FIG. 6A, the icons include "Task" 605, "Job" 607, and "Task Row" 609. By right-clicking an icon 605, 607, 609 or by otherwise indicating their selection, a new window is opened for display of the model for the associated class. The user is then able to define or edit the model, which preferably corresponds to a Petri net.

For example, in the example user interface shown in FIG. 6B, the user has right-clicked the icon 605 for the "Task" class, and a new window 611 entitled "Task" has been opened. Within window 611, the states 613, 615, 617, 619 and transitions 614, 616, 618, 620 of the model are shown and can be edited or defined. Transitions 614, 616, 618, 620 (arcs) between states can be created via dragging and dropping of one state onto another or otherwise. Once the transitions 614, 616, 618, 620 have been created, a method corresponding to each transition 614, 616, 618, 620 may be defined or edited by right-clicking the transition 614, 616, 618, 620.

In an embodiment of the invention, the formulation of the model is an extension of the Petri's net. In order to minimize state explosion, activation tokens carry a hidden state. The token hidden state is preferably used to define the state of the model itself through logical expressions in state and transitions (e.g., guard/post). This feature insures that all relevant details are included in the simulation without impairing the readability of the model.

Figure 3:
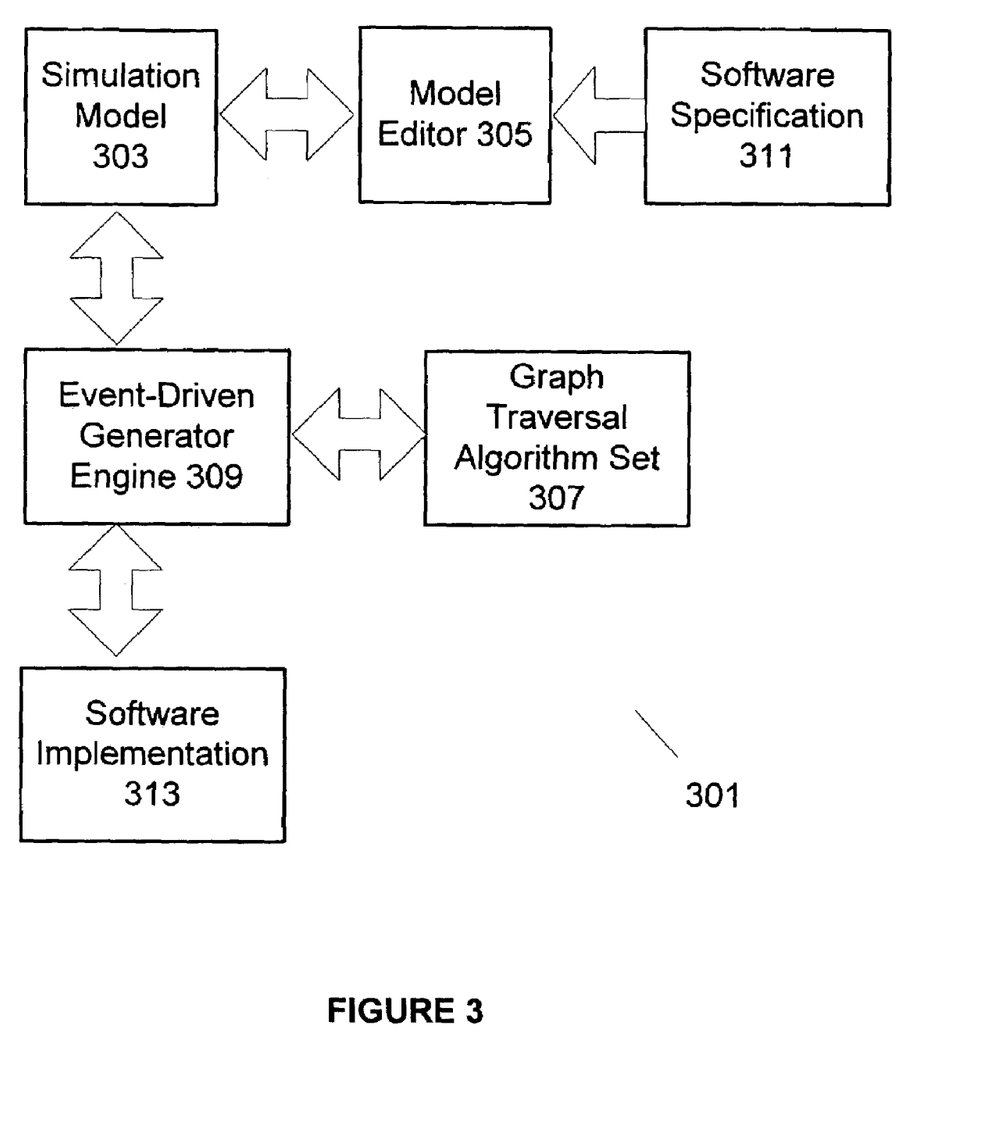
FIG. 3 is an architectural diagram of a software error-checking system in accordance with an embodiment of the invention.

In testing the assembly under test, the event driven generator engine 309 stimulates the firing of transitions in the assembly under test in accordance with a graph traversal algorithm from the graph traversal algorithm 307 and observes the resultant state of the program. The collection of data regarding the state of the program may be accomplished via system reflection. To minimize the amount of data collected, it is preferable to collect such data only after the system has stabilized after a firing. The set of occurrences resulting from a fired event can be referred to as a single transaction. The event driven generator engine 309 compares the list of objects that have been modified and their states with the same properties in the model, which has been identically stimulated, and produces an analysis based thereon.

Initially, the event driven generator engine 309 checks that only the objects that should have changed according to the model have changed in the system under test during the transaction. A transaction is given a status. In an embodiment of the invention, the status of a transaction may be one of "Success," "No Operation," "Bug," and "Unknown."

A status of "Success" indicates that no object was modified other than those that were expected to be modified during the transaction. A status of "No Operation" indicates that the event driven generator engine 309 fired an event which could have revealed a route to a disallowed transition (i.e. a "sneak path"), and the result was that the system was robust and that no object was modified other than those that were expected to be modified. A status of "Bug" indicates that either a defect or a sneak path was found as a result of the transaction. When a bug is indicated, the event driven generator engine 309 may prune the sequence of transactions and launch a debugger on the transaction prior to the one in which the bug was found. Finally, a status of "Unknown" indicates that a bug occurred but that the event driven generator engine 309 is unable to know whether the error occurred in an object during the transaction or instead occurred in an external resource. For example, a network time-out would be viewed by the event driven generator engine 309 in embodiment of the invention as an error occurring in an external resource.

A flow chart of a process of developing error-checked software according to an embodiment of the invention is hereinafter described with reference to FIG. 7. Initially, a specification for the software of interest is developed at step 701. The specification is a description of the manner in which the software should perform once written. As discussed above, this step is performed by personnel, such as management personnel, and the personnel developing the specification may or may not overlap with the development personnel that will eventually write the software. At step 703, which may be accomplished in parallel with step 701, development personnel write code that corresponds to the specification. There may be alterations made to the specification while the software is being written, as issues arise and are resolved.

Figure 7:
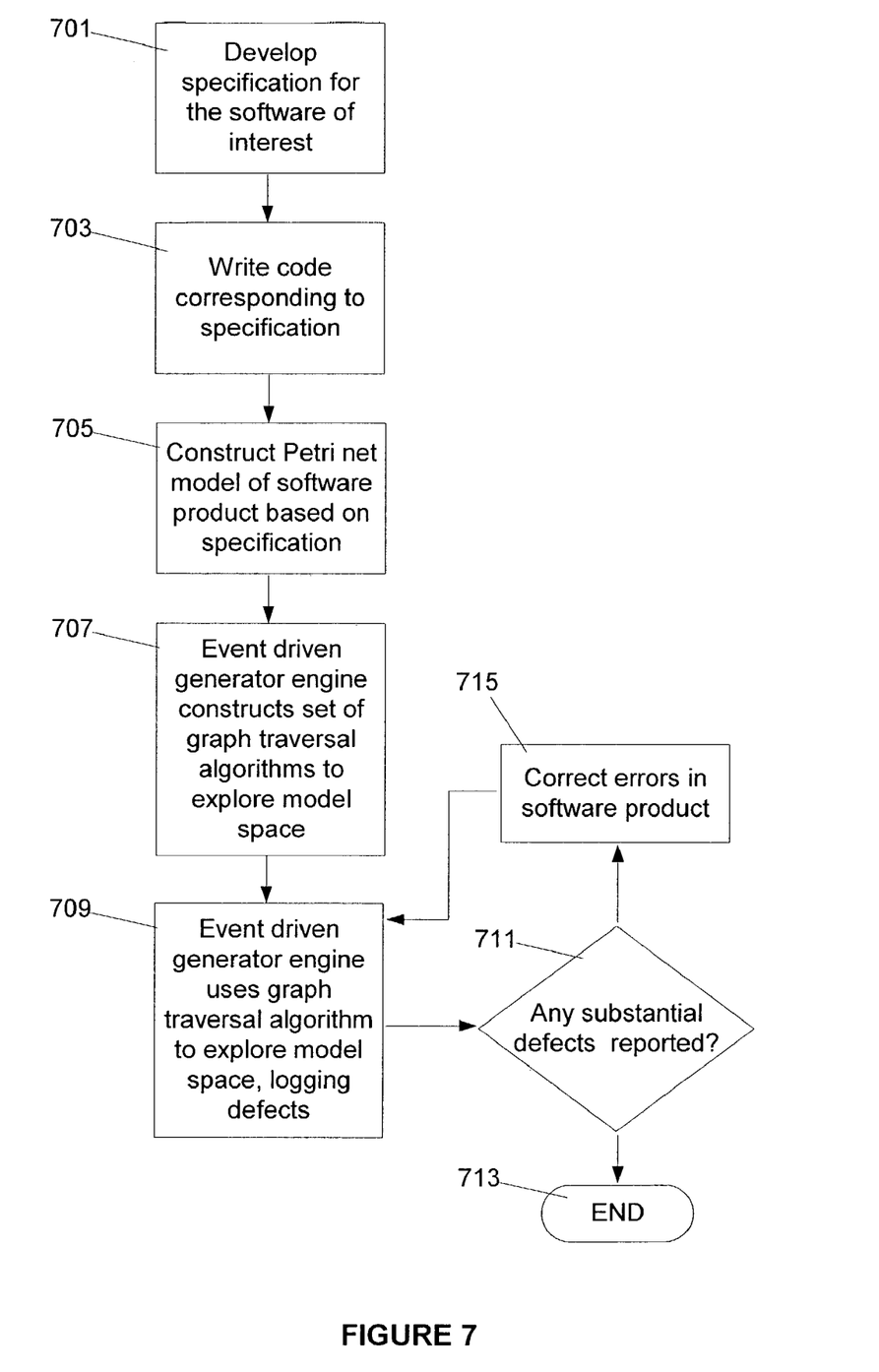
FIG. 7 is a flow chart illustrating steps taken in accordance with an embodiment of the invention to produce error-checked software.

At this stage in the process of FIG. 7, a software specification has been created and a software product that ostensibly meets that specification has been created as well. In the following steps, the software code is checked and refined. In particular, at step 705, a tester, who may or may not be a developer, constructs a Petri net model of the software product based on the specification. As discussed above, some of the work of constructing the model may be automated, such as via extraction of class definitions from the software product. Once the model has been developed, the tester uses an event driven generator engine to test the software via the model. In particular, at step 707, the event driven generator engine constructs a set of graph traversal algorithms that can be used to define different routes of exploration through the space defined by the model. For example, a graph traversal algorithm may establish an initial state of the system and may then cause specified transitions to be fired. Random exploration of the model space is also possible. Transitions with respect to states are preferably weighted to give the probability of occurrence for each transition, with the weights also being usable to forbid one or more transitions, such as private transitions or transitions known to be error-prone.

At step 709, the event driven generator engine uses a graph traversal algorithm to explore the model space, checking that the state of the software implementation is consistent with the corresponding state of the model. Note that in embodiments of the invention, a tester may choose to ignore certain areas of the model. As part of this process, the event driven generator engine preferably also maintains a record of defects found while exploring the model space. For example, an error would be evident when after a particular transition, or transaction of transitions, the state of the affected components in the model is different from the state of the affected components in the software product, or when the identity of at least one of the affected components in the model or software product is different from the identity of every affected component in the other of the model or software product.

At step 711 the tester determines whether any substantial defects have been reported. The inquiry as to whether any substantial defects were reported may consist of an inquiry as to whether any defect at all has been reported, or may be instead an inquiry as to whether any defect greater than an acceptable severity has been reported. If no substantial defects were reported then the software product is approved for release and the process terminates at step 713. If instead it is determined at step 711 that one or more substantial defects were reported, then the process continues to step 715 for further development of the software to correct some or all of the reported errors. At this step, the goal in an embodiment of the invention is to modify the software to correspond to the software specification as was originally intended. After the software has been redeveloped to correct the reported error or errors, it may be tested again as at step 709 or may be released. Generally, if it is tested again, it will not be necessary to reconstruct the model and the graph traversal algorithm set before checking for errors.

It will be appreciated that an improved software testing method and system has been described, the method and system employing a Petri net model for simulation of a software product. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A system for error-checking a software product comprising:
   at least one processor and a computer-readable storage medium coupled to the at-least one processor;
   a model of the software product defining a model space comprising a set of states of the model, the model having places, transitions, and tokens, wherein a transition is operable to pass at least one token from at least one place, and wherein the model of the software product comprises components automatically extracted from the software product; and
   a simulation engine for manipulating the software product and the model of the software product to cause an occurrence of an event in the software product and to cause an occurrence of a corresponding transition in the model of the software product, and to compare a state of the software product after occurrence of the event with the state of the model of the software product after occurrence of the corresponding transition, and to log errors found in the software product.

2. The system according to claim 1, wherein logged errors are determined when the state of the software product after occurrence of the event differs from the state of the model of the software product after occurrence of the corresponding transition.

3. The system according to claim 1, further comprising a graph traversal algorithm set, in accordance with which the software product and the model of the software product are manipulated by the simulation engine.

4. The system according to claim 1, further comprising a model editor for creating and manipulating the model of the software product.

5. The system according to claim 4, wherein the model editor comprises a visual user interface having therein visual model components that are selectable and mutable by a user.

6. The system according to claim 5, wherein the visual user interface of the model editor further comprises a window having model units, each model unit comprising model components, wherein selection of a model unit causes the components of the selected unit to be displayed in a separate window as visual model components.

7. The system according to claim 1, wherein the components automatically extracted from the software product include a component corresponding to a method of a class in the software product and a component corresponding to an attribute of the class in the software product.

8. A computer-implemented method of producing error-checked software code comprising:
   producing a body of software code to be error-checked;
   creating a model of the desired functionality of the software code to be error-checked, wherein the model comprises at least one Petri net, and wherein creating a model of the desired functionality of the software code to be error-checked comprises extracting information from the software code to be error-checked; and
   dynamically determining whether there is a difference in behavior of the software code to be error-checked as compared to the behavior of the model, whereby if there is such a difference in behavior, the difference is logged as an error found in the software code to be error-checked.

9. The method according to claim 8, further comprising modifying the software to eliminate the logged error.

10. The method according to claim 8, wherein the model of the desired functionality of the software code to be error-checked is derived from a specification for the software code to be error-checked.

11. The method according to claim 8 wherein extracting information from the software code to be error-checked comprises extracting an attribute and a method of a class of the software code to be error-checked, wherein the attribute and method are used as a state and a transition respectively in the model.

12. The method according to claim 8, wherein the model defines a model space consisting of a set of states of the model, and wherein dynamically determining whether there is a difference in behavior of the software code to be error-checked as compared to the behavior of the model comprises receiving a graph traversal algorithm and traversing the model space pursuant to the received graph traversal algorithm.

13. A computer-readable storage medium having stored thereon computer-executable instructions for performing the method according to claim 8.

14. A computer-implemented method for testing a software product to identify at least one error in the software product comprising:
   receiving input by the software product from a simulation engine;
   in response to said input, causing the occurrence of an event in the software product, whereby a state of the software product after the occurrence of said event is comparable with a state of a corresponding model of the software product to identify the at least one error found in the software product, wherein the model comprises components automatically extracted from the software product; and
   providing data associated with the at least one error for review.

* * * * *